United States Patent
Williams et al.

(10) Patent No.: US 12,255,990 B2
(45) Date of Patent: Mar. 18, 2025

(54) QUANTUM STREAMING

(71) Applicant: ARQIT LIMITED, London (GB)

(72) Inventors: David Williams, Surrey (GB); Barry Childe, Sussex (GB)

(73) Assignee: Arqit Limited, London (GB)

( * ) Notice: Subject to any disclaimer, the term of this patent is extended or adjusted under 35 U.S.C. 154(b) by 271 days.

(21) Appl. No.: 18/017,060

(22) PCT Filed: Jul. 20, 2021

(86) PCT No.: PCT/GB2021/051862
§ 371 (c)(1),
(2) Date: Jan. 19, 2023

(87) PCT Pub. No.: WO2022/018431
PCT Pub. Date: Jan. 27, 2022

(65) Prior Publication Data
US 2023/0299948 A1 Sep. 21, 2023

(30) Foreign Application Priority Data
Jul. 20, 2020 (GB) .................................. 2011220

(51) Int. Cl.
*H04L 9/08* (2006.01)
*G06N 10/80* (2022.01)
(Continued)

(52) U.S. Cl.
CPC ........... *H04L 9/0852* (2013.01); *G06N 10/80* (2022.01); *H04L 9/085* (2013.01); *H04L 9/14* (2013.01); *H04L 63/0457* (2013.01)

(58) Field of Classification Search
CPC ......... H04L 9/085; H04L 9/0852; H04L 9/14; H04L 63/0457; G06N 10/80
(Continued)

(56) References Cited

U.S. PATENT DOCUMENTS

2003/0208693 A1 11/2003 Yoshida
2014/0122876 A1 5/2014 Johnson et al.
(Continued)

*Primary Examiner* — James E Springer
(74) *Attorney, Agent, or Firm* — Dentons US LLP

(57) ABSTRACT

Method(s), system(s), apparatus are provided for quantum safe quantum streaming between a first endpoint device and second endpoint device via a server of a quantum cloud platform. Splitting, at the first endpoint device, a data item into a plurality of data shards that allow reconstruction of the data item. Encrypting, at the first endpoint device, each of the data shards separately using a first cryptographic key shared between the first endpoint device and the second endpoint device. Establishing, between the first endpoint device and the server, a first plurality of secure channels with the server of the quantum cloud platform using a second cryptographic key, the second cryptographic key shared between the endpoint and the server. Transmitting, from the first endpoint device to the server, the plurality of encrypted shards towards the second endpoint device via the server over the plurality of secure channels. Receiving, at the server, the plurality of encrypted data shards of the data item transmitted from the first endpoint device over the first plurality of secure channels, each data shard encrypted using the first cryptographic key known only to the first endpoint device and the second endpoint device. Securely storing, by the server, the encrypted data shards of the data item in a secure storage of the quantum cloud platform. In response to the second endpoint logging onto the quantum cloud platform, establishing a second plurality of secure channels with the second endpoint using a third cryptographic key, the third cryptographic key shared between the second endpoint device and the server. Retrieving the encrypted data shards of the data item from secure storage. Transmitting the encrypted data shards over the second plurality of secure channels to the second endpoint device. Receiving, at the second endpoint, a plurality of encrypted data shards of the (Continued)

encrypted data item from the server over the second plurality. Decrypting the encrypted data shards using the first cryptographic key to reconstruct the data item transferred from the first endpoint device to the second endpoint device.

21 Claims, 5 Drawing Sheets

(51) Int. Cl.
 *H04L 9/14* (2006.01)
 *H04L 9/40* (2022.01)
(58) Field of Classification Search
 USPC .......................................................... 380/42
 See application file for complete search history.

(56) References Cited

U.S. PATENT DOCUMENTS

2018/0254892 A1* 9/2018 Egorov ................ H04L 9/0891
2019/0318356 A1 10/2019 Martin et al.
2021/0303712 A1* 9/2021 Bowen .................... G06F 21/31

* cited by examiner

QUANTUM STREAMING

CROSS REFERENCE TO RELATED APPLICATIONS

This application is the National Stage filing under 35 U.S.C. 371 of International Application No. PCT/GB2021/051862, filed on Jul. 20, 2021, which claims benefit of and priority to GB Application No. 2011220.7, filed on Jul. 20, 2020, all of which are hereby incorporated by reference in their entirety for all purposes as if fully set forth herein.

The present application relates to a system and method for quantum streaming and applications thereto.

BACKGROUND

Cryptography is used to protect billions of transactions every day from, without limitation, for example Transport Layer Security (TLS) security for online shopping and banking to ultra-secure government communications. These transactions rely on reliable and secure means for at least two or more transacting parties to share a secret key, enabling encryption of data by one party and subsequent decryption by the other party(ies). When commercially usable universal quantum computers become available, a variety of these types of transactions, tasks and applications including, without limitation, for example digital banking, web certification, Know Your own Client (KYC), digital asset transfer, and authentication will be vulnerable, and some are already vulnerable to conventional cyber attacks. These transactions, tasks and applications are currently provided using software systems that typically use conventional cryptography and/or encryption techniques and protocols that are not sufficiently resilient enough to withstand an attack from such quantum computers (QCs) or other advanced cyber attack methods.

QCs can potentially crack many classical cryptography codes almost effortlessly. There has also been a ground swell in interest in quantum computing within the last year as a result of the success of D-Wave in selling commercial systems. Furthermore, a number of breakthroughs by technology companies such as, without limitation, for example Microsoft®, IBM®, Intel®, Google® and others in QC techniques promise to make a universal QC viable in the near future (e.g. five to ten years time). QCs have already become a threat to current, in 2016 NIST reported the impact of QCs on common cryptographic algorithms in a report by L. Chen, S Jordan, Y Liu, D Moody, R Peralta, Ray Periner, D Smith-Tone, "Report on Post-Quantum Cryptography", NISTIR 8105, 2016 (https://nvlpubs.nist.gov/nistpubs/ir/2016/NIST.IR.8105.pdf). This means that cryptographic protocols using these cryptographic algorithms will be vulnerable and no longer secure. For example, such cryptographic protocols include, without limitation, for example, Transport Layer Security (TLS), https, Secure Sockets Layer (SSL), Secure Shell (SSH) used in, without limitation, for example searches, certification and/or banking applications and the like. For example, TLS using ECDHE-RSA, AES (128-bit) GCM and SHA256 for searches/search engines will be broken or weakened. For example, TLS using ECDHE-RSA with AES (256-bit) GCM and SHA (384-bit) for banking applications and the like will be broken or weakened. It is estimated that server certificates, client certificates, and public key cryptography will be broken and insecure.

For example, current methods to exchange cryptographic keys between two parties are vulnerable to QC attack. If the cryptographic primitives involved in the key-exchange protocol can be broken, the exchanged key is compromised and the encrypted data is revealed to the attacker. Classical key-exchange protocols are based on the hardness of integer factorization (e.g. Diffie-Hellman (DH)) or the discrete logarithm problem (e.g. Elliptic-Curve DH (ECDH)). Neither of these problems is guaranteed to be hard and both problems can be broken by a QC in polynomial time. This is of particular concern to both large and small organisations, corporations and also to individual users of public and private networks (e.g. Internet or corporate Intranets). If one is unable to reliably perform key exchange, then all current transactions, tasks and applications are vulnerable to attack by a QC.

The field of "Quantum Cryptography" aims to address these risks by developing both quantum secure cryptographic algorithms (so-called quantum-safe algorithms) and Quantum Key Distribution (QKD) techniques. Whilst the combination of both provides the ultimate solution, QKD as a stand-alone technique still has much to offer and is not in itself reliant on the development of quantum-safe algorithms to become widely adopted. However, even reliably performing QKD at scale for a wide range of users from small to large corporations and/or individuals is still a costly and time consuming exercise.

There is a desire for a robust, secure and cost effective approach for providing quantum-safe solutions for at least communications and/or streaming of data items between users. Such a solution also provides protection against advanced non-quantum cyberattacks.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides systems, apparatus, mechanisms, methods and process(es) for quantum safe quantum streaming of data items from an endpoint device to another endpoint device via a server of a quantum cloud platform, where each endpoint device a plurality of secure channels for sending and/or receiving encrypted data shards, the data shards encrypted with a cryptography key known only by each endpoint device. Each of the plurality of secure channels secured with the server with a cryptography key known only to the server and the corresponding endpoint device. The cryptography keys may be quantum safe keys that are distributed to each end point device and/or server, which means that the data item is quantum safe streamed from one endpoint device to another endpoint device.

In a first aspect, the present disclosure provides a computer-implemented method of quantum safe streaming and/or storing one or more data item(s) from a first endpoint device to a second endpoint device via a server of a quantum cloud platform, the method, performed at the first endpoint device, comprising: splitting a data item into a plurality of data shards that allow reconstruction of the data item;

encrypting each of the data shards separately using a first cryptographic key shared between the first endpoint device and the second endpoint device; establishing a series or a first plurality of secure channels with a server of a quantum cloud platform using a second cryptographic key, the second cryptographic key shared between the endpoint and the server; and transmitting the plurality of encrypted shards towards the second endpoint device via the server over the plurality of secure channels.

In a second aspect, the present disclosure provides a computer-implemented method of quantum safe quantum streaming of data items from a first endpoint device to a second endpoint device via a server of a quantum cloud platform, the method, performed at the server, comprising: receiving a plurality of encrypted data shards of a data item from the first endpoint device from a first plurality of secure channels, each data shard encrypted using a first cryptographic key known only to the first endpoint device and the second endpoint device and the first plurality of secure channels established with the first endpoint device based on a second cryptographic key known only to the first endpoint device and the server; securely storing the encrypted data shards of the data item in a secure storage of the quantum cloud platform; in response to the second endpoint logging onto the quantum cloud platform, establishing a second plurality of secure channels with the second endpoint using a third cryptographic key, the third cryptographic key shared between the second endpoint device and the server; retrieving the encrypted data shards of the data item from secure storage; transmitting the encrypted data shards over the second plurality of secure channels to the second endpoint device.

In a third aspect, the present disclosure provides a computer-implemented method of quantum safe quantum streaming of data items from a first endpoint device to a second endpoint device via a server of a quantum cloud platform, the method, performed at the second device comprising: connecting to a quantum cloud platform; in response to a data transfer of an encrypted data item from the first endpoint device, the encrypted data item encrypted with a first cryptographic key known only to the first and second endpoints, establishing a plurality of secure channels with the server using a third cryptographic key, which is known only to the second endpoint device and the server; receiving a plurality of encrypted data shards of the encrypted data item from the server over the plurality of secure channels; decrypting the encrypted data shards using the first cryptographic key to reconstruct the data item transferred from the first endpoint device.

In a fourth aspect, the present disclosure provides a computer-implemented method for quantum safe quantum streaming between a first endpoint device and second endpoint device via a server of a quantum cloud platform comprising: splitting, at the first endpoint device, a data item into a plurality of data shards that allow reconstruction of the data item; encrypting, at the first endpoint device, each of the data shards separately using a first cryptographic key shared between the first endpoint device and the second endpoint device; establishing, between the first endpoint device and the server, a first plurality of secure channels with the server of the quantum cloud platform using a second cryptographic key, the second cryptographic key shared between the endpoint and the server; and transmitting, from the first endpoint device to the server, the plurality of encrypted shards towards the second endpoint device via the server over the plurality of secure channels; receiving, at the server, the plurality of encrypted data shards of the data item transmitted from the first endpoint device over the first plurality of secure channels, each data shard encrypted using the first cryptographic key known only to the first endpoint device and the second endpoint device; securely storing, by the server, the encrypted data shards of the data item in a secure storage of the quantum cloud platform; in response to the second endpoint logging onto the quantum cloud platform, establishing a second plurality of secure channels with the second endpoint using a third cryptographic key, the third cryptographic key shared between the second endpoint device and the server; retrieving the encrypted data shards of the data item from secure storage; transmitting the encrypted data shards over the second plurality of secure channels to the second endpoint device; receiving, at the second endpoint, a plurality of encrypted data shards of the encrypted data item from the server over the second plurality of secure channels; and decrypting the encrypted data shards using the first cryptographic key to reconstruct the data item transferred from the first endpoint device.

As an option, the computer-implemented method according to any of the first, second, third and fourth aspects, wherein the first cryptographic key is a first quantum safe key, the second cryptographic key is a second quantum safe key, and the third cryptographic key is a quantum safe key. As another option, the computer-implemented method according to any of the first, second, third and fourth aspects, wherein the quantum cloud platform comprises a quantum-safe (QS) network, the QS network comprising one or more QS server(s) and a repository for storing and accessing said data item(s), each QS server comprising a hardware security module (HSM) for storing an identical set of quantum distributed (QD) keys or quantum safe keys, said identical set of QD keys having been distributed to each of said QS server(s) in a quantum-safe manner, and said QS server(s) configured to communicate securely with each other and the repository using one or more available QD keys from the identical set of QD keys, one or more further available QD keys from the set of QD keys being distributed as quantum safe keys to each of the endpoint devices.

In a fifth aspect, the present disclosure provides an apparatus comprising a processor unit, a memory unit, and a communication interface, the processor unit connected to the memory unit and the communication interface, wherein the processor unit, memory unit and communication interface are adapted to implement the computer-implemented method according to first aspect.

In a sixth aspect, the present disclosure provides an apparatus comprising a processor unit, a memory unit, and a communication interface, the processor unit connected to the memory unit and the communication interface, wherein the processor unit, memory unit and communication interface are adapted to implement the computer-implemented method according to the second aspects.

In a seventh aspect, the present disclosure provides an apparatus comprising a processor unit, a memory unit, and a communication interface, the processor unit connected to the memory unit and the communication interface, wherein the processor unit, memory unit and communication interface are adapted to implement the computer-implemented method according to the third aspect.

In an eighth aspect, the present disclosure provides a system comprising: an first endpoint device comprising an apparatus according to the fifth aspect; a second endpoint device comprising an apparatus according to the sixth aspect; and a server comprising an apparatus according to the seventh aspect, wherein the first and second endpoint devices are in communication via the server.

In a ninth aspect, the present disclosure provides a computer-readable medium comprising computer code or instructions stored thereon, which when executed on a processor, causes the processor to perform the computer implemented method according to the first aspect.

In a tenth aspect, the present disclosure provides a computer-readable medium comprising computer code or instructions stored thereon, which when executed on a processor, causes the processor to perform the computer implemented method according to the second aspect.

In an eleventh aspect, the present disclosure provides a computer-readable medium comprising computer code or instructions stored thereon, which when executed on a processor, causes the processor to perform the computer implemented method according to the third aspect.

In a twelfth aspect, the present disclosure provides a computer-readable medium comprising computer code or instructions stored thereon, which when executed on a processor, causes the processor to perform the computer implemented method according to the fourth aspect.

In a thirteenth aspect, the present disclosure provides a system as herein described with reference to the accompanying drawings.

In a fourteenth aspect, the present disclosure provides a quantum cloud platform as herein described with reference to the accompanying drawings.

In a fifteenth aspect, the present disclosure provides a method as herein described with reference to the accompanying drawings.

In a sixteenth aspect, the present disclosure provides an apparatus as herein described with reference to the accompanying drawings.

In a seventeenth aspect, the present disclosure provides a computer program product as herein described with reference to the accompanying drawings.

In a eighteenth aspect, the present disclosure provides a quantum safe streaming method as herein described with reference to the accompanying drawings.

In a nineteenth aspect, the present disclosure provides an apparatus as herein described with reference to the accompanying drawings.

In a twentieth aspect, the present disclosure provides a computer program product as herein described with reference to the eighteenth aspect.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1A:
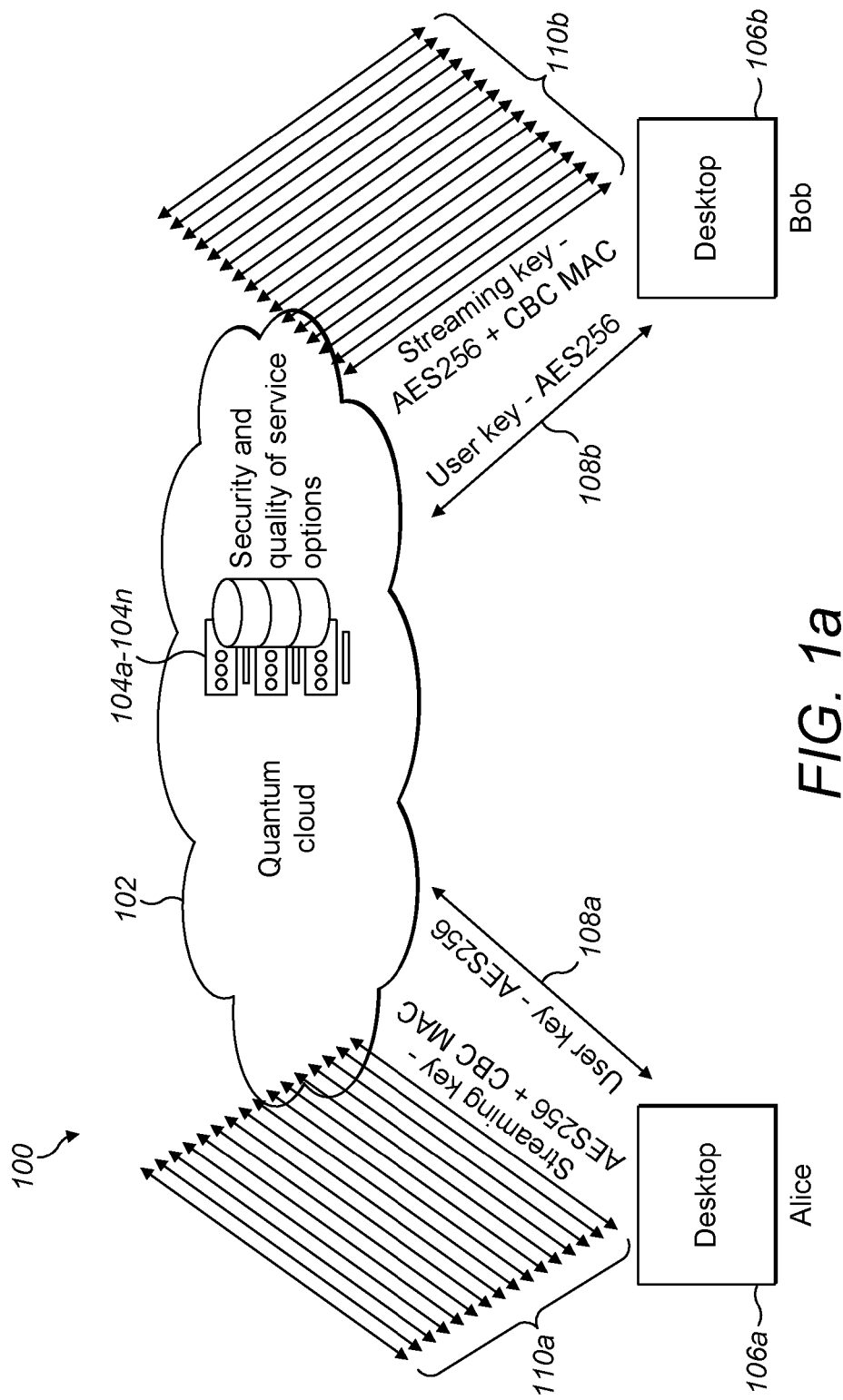
FIG. 1a is a schematic diagram illustrating an example quantum streaming system according to some embodiments of the invention.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The present disclosure provides method(s), apparatus and system(s) for quantum-safe quantum streaming of data or data items between devices and/or users of a quantum cloud platform. The quantum streaming system is configured to provide provably QS quantum data streaming in relation to streaming of data items between two or more devices in a quantum safe manner via the quantum cloud platform. QS streaming of data via the QS cloud platform may be achieved by separating or dividing a data item such as, without limitation, data or file that is to be transferred into a set of several quantum secured 'streams' (or data streams), where each data stream is independently secured and transfers according to partial data streaming protocols and operations (e.g. via HTTP(S) POST and GET operations). The advantage of using QS quantum secured streams via the QS cloud platform is that it decouples the upload of data from the download of the data. Thus, in the event that both end-point devices (e.g. distributor to one or more user/recipient transfers, or user-user (or recipient-recipient) transfers) are not simultaneously online (or that the recipient is not able to receive the entirety of the data due to storage restrictions), a "central server" (e.g. QS server) of the quantum cloud platform can act as a secure, untrusted mid-point, allowing selective retrieval of information when the recipient and/or distributor and the like are online. For example, QS quantum data streaming can enable streaming of data items for the quantum cloud platform with security, user and data permissioning and quality of service options for the distributor and recipient, sender and/or receiver and the like. This may be performed in a time boxed solution or fashion. There are many applications in which QS quantum streaming may be performed, without limitation, for example, data items representative of data, offers and/or market information used over the quantum cloud platform and the like.

Conventionally, data streams must be pre-encrypted, or simply protected by channel encryption. The present disclosure ensures that every packet of data is individually quantum encrypted and parallel streamed in real time across up to a plurality of individual quantum key encrypted data channels. For example, up to N individual quantum key encrypted channels, where N may depend on, without limitation, for example hardware capabilities, software capabilities, bandwidth capacities of channels between recipients/users and the quantum cloud platform and the like (e.g. N=16).

In addition, secure streaming of data is becoming increasingly important. For example in forthcoming 5G telecommunication networks and beyond, any form of targeted user content (e.g. video, data files, applications programmes, live market data, vehicle or identity data, transaction data) does not have to be batch delivered but, instead, can be securely streamed in a QS manner and protected by quantum keys. This can be used to create unique user experiences, but with total auditing of user access and security control of the information being streamed in a QS manner. Quantum cloud services operating on the quantum cloud platform may have the added ability to securely communicate and authenticate, without limitation, for example data and/or media information providing protection from deep fakes for customers/users of the quantum cloud platform and the like.

Moreover, mobile communication devices may sometimes require the download of large data items or files (for example video content) from network servers or peers, but such mobile devices may suffer from relatively limited local storage capacity and variable network connectivity. With these limitations, downloading large data or video files can be problematic. Streaming may carry the following advantages over downloading such as, without limitation, for example instant viewing, no download time, no need for memory space on the mobile device, instant playback, quality of service options for the distributor and recipient. However, it is important to protect the streaming content, thus streaming technologies may be married/combined with quantum key distribution (QKD) and a unique quantum key multiplexed data transfer mechanism to form the QS quantum streaming system and process(es). The QS quantum streaming protocol may be based on a method or process of separating a file transfer into a set of several quantum secured 'streams', where each stream is independently secured and transfers partial data via HTTP(S) POST and GET operations or future TLS/SSL HTTP(S) operations. Every packet of data is individually quantum encrypted and parallel streamed in real time across a plurality of individual and unique quantum key encrypted data channels. This may be achieved by using the quantum cloud platform as an intermediary, in which a distributor or sender (e.g. sender device) may distribute and/or transfer data to the quantum cloud platform and then, from the quantum cloud platform to one or more recipient or receivers (e.g. receiving devices). In particular, the data may be streamed to one or many registered quantum cloud users, with individual access and security controls applied for each recipient.

FIG. 1a is a schematic diagram illustrating a quantum cloud system 100 for use in performing quantum-safe (QS) quantum streaming of data items according to some embodiments of the invention. In this example, the quantum cloud platform 102 includes a quantum cloud network formed by a plurality of QS server(s) 104a-104n, in which one or more of the QS server(s) include components that are configured to perform and/or control the registration of users, storage, retrieval, access and/or use or application of data items, and/or QS communications between, without limitation, for example devices, servers, or end-points of the users and/or customers and the like. Users of end-point devices 106a or 106b, servers, and/or communication devices may connect and/or register with the QS cloud platform 102 via one or more of the QS server(s) 104a-104n for registering, transferring, storing, retrieving, accessing, and/or using applications and/or services associated with data being transferred across the QS network of the QS cloud platform 102 and the like in a QS manner. This may include user device(s) or end-point(s) establishing QS communications channels with the QS network and/or other devices of users registered in the QS network and the like and/or as the application demands.

A user or customer end-point device or device may comprise or represent any device, computing device and/or communications device capable of communicating over a communication network, where the device/computing device and/or communication device is associated with the user or customer. Examples of end-point devices and/or devices may include, without limitation, for example a laptop, desktop computer, personal computer, mobile phone, smart-phone, or Internet of Things (IoT) device and the like, user server, customer server(s), and/or any other computing or communication device. Users and/or customer end-point devices and/or communications devices may establish a quantum-safe communication channel with the QS cloud platform, within the QS system and/or end-to-end quantum-safe communication channel with other user and/or customer end-point devices. This may be achieved through the end-point device connecting to a QS server and/or a corporate network hosting a QS server that includes, without limitation, for example a satellite quantum key distribution (SKQD) system and so has a set of Quantum Distributed (QD) keys, one or more of which may be assigned to the end-point device 106a or 106b of a user and stored in a secure enclave or secure memory on the end-point device 106a or 106b. The end-point device 106a and 106b may use the one or more assigned QD keys to establish a quantum safe channel with the QS system, and hence, may establish a quantum safe channel to other one or more similarly configured end-point device(s) and the like.

A quantum channel or quantum communication channel may comprise or represent a communication channel capable of transmitting and/or receiving at least quantum information. Examples of a quantum channel or quantum communication channel or quantum channel that may be used according to the invention may include or be based on, without limitation, for example one or more types of quantum communication channels associated with the group of: optical quantum communications; free-space optical quantum communications; optical fibre quantum communications; optical laser quantum communications; communications using electromagnetic waves such as, without limitation, for example radio, microwave, infra-red, gigahertz, terahertz and/or any other type of electromagnetic wave communications; communications based on electron spin and the like; any other type of quantum communications for transmitting and receiving data over a quantum communication channel between devices. It is noted that one or more types of quantum communication channel may be capable of transmitting and/or receiving non-quantum, or classical, information.

A communication channel or standard, classical or non-quantum communication channel may comprise or represent any communication channel between two devices that at least is capable of transmitting and/or receiving non-quantum information. Examples of a communication channel, and/or standard, classical and/or non-quantum communication channel according to the invention may include or be based on, without limitation, for example on one or more types of communication channel from the group of: any one or more physical communication channels; optical communication channels; free-space optical communication channels; wireless communication channels; wired communication channels; radio communication channels; microwave communication channels; satellite communication channels; terrestrial communication channels; optical fibre communication channels; optical laser communication channels; telecommunications channels; 2G to 6G and beyond telecommunications channels; logical channels such as, without limitation, for example Internet Protocol (IP) channels; any other type of logical channel being provided over any standard, classical or non-quantum physical communication channel; one or more other physical communications or carriers of data such as, without limitation, for example avian carriers, paper, sealed briefcases, courier or other delivery service and the like; any other type of one or more optical, wireless and/or wired communication channels for transmitting data between devices; and/or two or more optical, wireless and/or wired communication channels that form a composite communication channel for transmitting data between devices; and/or any combination of two or more standard, classical or non-quantum communication channels that form a composite communication channel for transmitting and/or carrying data between devices; combinations thereof, modifications thereto, and/or as described herein and the like and/or as the application demands. It is noted that one or more types of communication channels, standard, classical or non-quantum communication channels may be capable of transmitting and/or receiving quantum information. As described, a quantum-safe (QS) communication channel comprises or represents a communication channel that is encrypted using a quantum safe key or a quantum-distributed (QD) cryptographic key or QD key.

The quantum cloud platform 102 may form a quantum safe network including one or more QS servers and a repository (e.g. distributed ledger technology (DLT)) for storing and accessing one or more data items. Each QS server may include a hardware security module (HSM) for storing an identical set of quantum distributed (QD) keys. The identical set of QD keys having been distributed to each of said one or more QS servers in a quantum-safe manner. The one or more QS servers are configured to communicate securely with each other and the repository using one or more available QD keys from the identical set of QD keys. The one or more QS servers may also distribute, in a quantum safe manner, one or more available QD keys from the set of QD keys to one or more endpoint devices 106a and 106b and/or as the application demands.

In this example, the quantum cloud system 100 comprises a pair of end-points 106a and 106b, which may be a first communication device 106a (e.g. Alice) and a second communication device 106b (e.g. Bob), respectively. These endpoints 106a and 106b are configured to form communication channels 108a and 108b with the quantum cloud platform 102. This pair of endpoints 106a and 106b may share a first cryptographic key known only to the endpoints (e.g. USER KEY—AES256). The first cryptographic key may be a QS key that has been exchanged between the endpoint devices 106a and 106b using a quantum key distribution protocol (QKD) and the like. Furthermore, a central server 104a (also known as a QS server of the plurality of QS servers 104a-104n) of the quantum cloud platform 102 may also share a cryptographic key with each of the endpoints 106a and 106b, which are known only to the corresponding endpoint 106a (or 106b) and the central server 104a. That is, the central server 104a may share a second cryptographic key with the first communication device/endpoint 106a and the central server may share a third cryptographic key with the second communication device/endpoint 106b. The second and third cryptographic keys may be different, thus these cryptographic keys are known only to the corresponding endpoint 106a (or 106b) and the central server 104a. The second and third cryptographic keys may also be QS keys that have been exchanged and/or securely retrieved, in a quantum-safe manner, from the central server 104a and the endpoint devices 106a and 106b. This may also involve using, without limitation, a quantum key distribution protocol (QKD) and the like.

Once these cryptographic keys have been shared, in order to send a data item or file from the first endpoint 106a (e.g. Alice) to the second endpoint 106b (e.g. Bob), at the first end-point 106a the quantum streaming process is configured to split the data item or file to be transferred into a plurality of data shards (e.g. an organised set of data item portions of the data item) that are configured to enable reconstruction of the data item or file from a partial subset of the plurality of data shards. Each data shard is separately encrypted using the first cryptographic key known only to the first and second endpoint devices 106a and 106b. The first endpoint device 106a communicates with the central server 104a of the cloud platform 102 (or a QS server of the quantum cloud platform 102) to establish a series of secure communication channels, or a plurality of secure communication channels 110a using the second cryptographic key (e.g. Streaming Key—AES256+CBC MAC) or equivalent cipher, shared between the first endpoint device 106a and the central server 104a. The plurality of encrypted data shards are uploaded to the central server 104a via the plurality of secure channels 110a. This may involve using, without limitation, for example HTTP POST operations for uploading the encrypted data shards of the data item/file to the central server 104a. The central server 104a of the quantum cloud platform 102 may combine the encrypted data items from the plurality of encrypted data shards. The central server 104a cannot decrypt each of the plurality of data shards. The central server 104a may then store the encrypted data item by dividing it into a further plurality of encrypted data shards (e.g. 6 encrypted data shards) each encrypted with its own cryptographic key and stores these encrypted data shards on the distributors (e.g. user of the first endpoint 106a) chosen storage medium within the quantum cloud platform 102. For example, the distributor may specify that the central server 104a may store at least three copies of each data shard, each with its own unique infrastructure generated quantum key, along with metadata for reassembling the shards of data. This metadata may involve reassembling the shards of data into an equivalent plurality of encrypted data shards that the first endpoint device 106a sent to the central server 104a. The encrypted data shards and metadata may be stored by the central server 104a in, without limitation, for example a distributed ledger technology (DLT) server or repository of the quantum cloud platform 102 for retrieval by the second endpoint device 106b. The data item may now be transferred to the second endpoint 106b.

Transferring the data item to the second endpoint device 106b may occur by requiring the second endpoint 106b securely logging on to the quantum cloud platform 102, where it is informed of the details and/or requirements of the transfer of the DLT stored data item. The second endpoint device 106b (e.g. Bob) may then establish another plurality of secure channels 110b using the third cryptographic key established between the central server 104a and the second endpoint device 106b. The encrypted shards of the data item stored in the DLT of the quantum cloud platform 102 may be retrieved and combined by the central server 104a to form the encrypted data item, where it is further divided into a further plurality of encrypted data shards. The further plurality of encrypted data shards may be based on the metadata associated with the data item and the data shards. This may include the original division or plurality of encrypted data shards that the first endpoint device 106a sent over to the central server 104a. Each of the plurality of data shards is encrypted with the third cryptographic key and transmitted over the plurality of secure channels 110b to endpoint device 106b. The transfer of the encrypted data shards from the central server 104a to the second endpoint device 106b may be based on using a series of HTTP GET operations. The second endpoint device 106b is able to decrypt each of the received data shards using the third cryptographic key, and then reconstruct the data item using the first cryptographic key used to encrypt the original set of shards when transmitted from the first endpoint device 106a to the central server 104a. The second endpoint device 106a thus reconstructs and decrypts the data item.

Figure 1B:
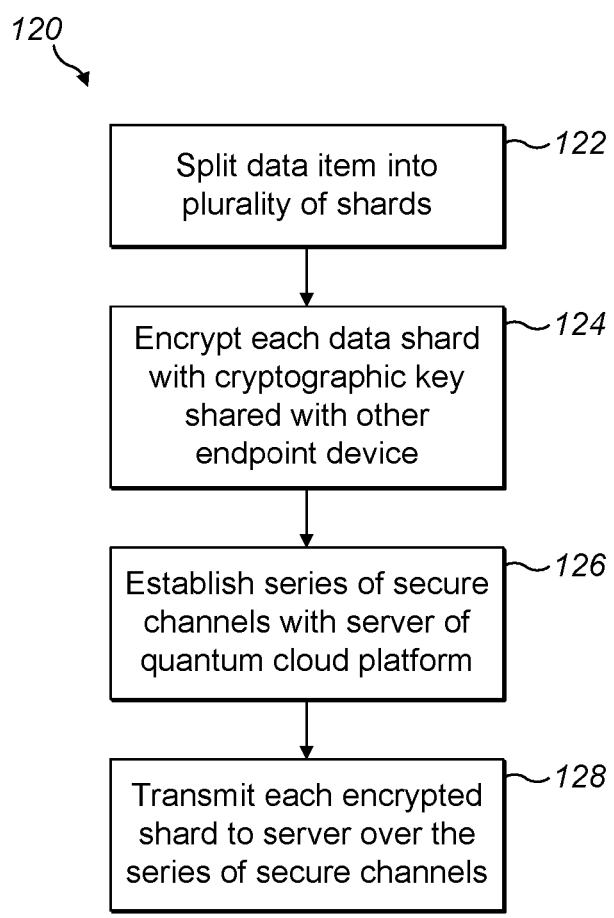
FIG. 1b is a flow diagram illustrating an example quantum streaming process according to some embodiments of the invention.

FIG. 1b is a flow diagram illustrating an example of a quantum streaming process 120 performed by the first endpoint device 106a for streaming a data item from the first endpoint to the second endpoint via the cloud server of the quantum cloud system 100 of FIG. 1a according to some embodiments of the invention. The quantum streaming process 120 may include the following steps, performed at the first endpoint device. In step 122, the file is split into a plurality of 'data shards' that allow reconstruction of the file from a partial subset of the data shards. In step 124, each of the data shards is separately encrypted using the first cryptographic key shared between the endpoints 106a and 106b. In step 126, a series or a first plurality of secure channels is established with a central server of the quantum cloud platform 102 using the second cryptographic key shared between the first endpoint 106a and the central server 104a. In step 128, the plurality of encrypted shards are transmitted to the central server 104a over the series or plurality of secure channels. This may include using HTTP POST operations for uploading the encrypted shards to the central server 104a.

Figure 1C:
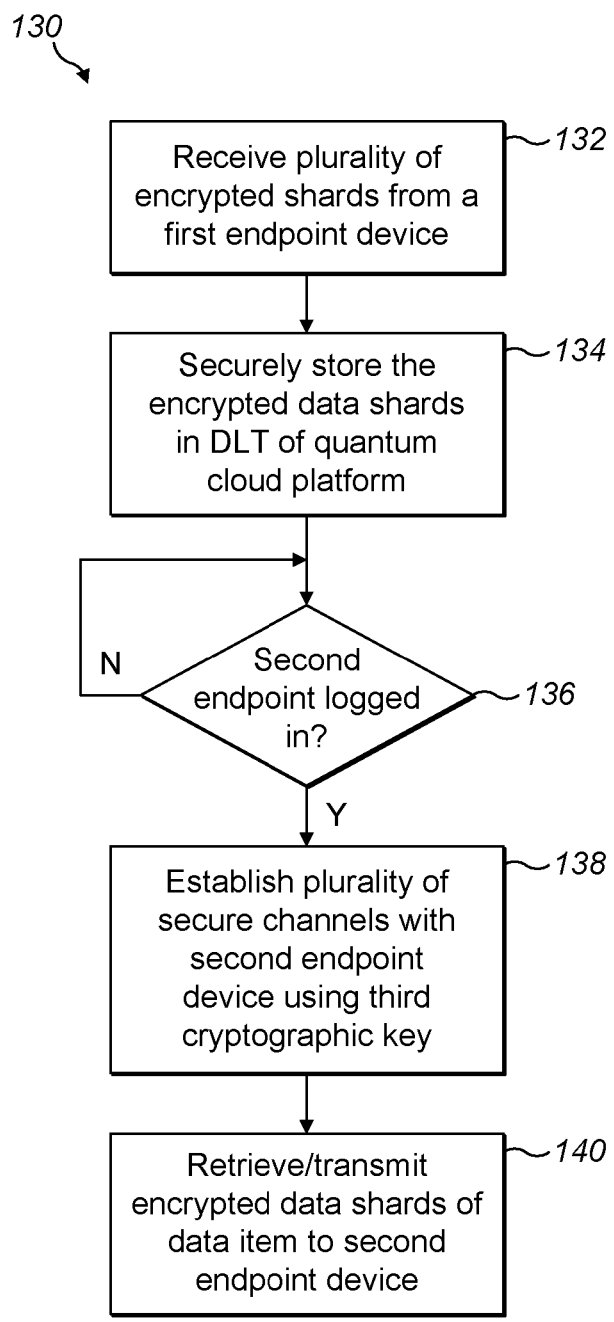
FIG. 1c is a flow diagram illustrating another example quantum streaming process according to some embodiments of the invention.

FIG. 1c is a flow diagram illustrating an example a quantum streaming process 130 performed by the central server 104a for streaming a data item from the first endpoint 106a to the second endpoint 106b via the cloud server 104a of the quantum cloud system 100 of FIG. 1a according to some embodiments of the invention. The quantum streaming process 130 may include the following steps, performed at the cloud server 104a. In step 132, receiving a plurality of encrypted shards from the first endpoint device 106a, each shard encrypted using the first cryptographic key known only to the first endpoint device 106a and the second endpoint device 106b. In step 134, securely storing the encrypted data shards in a secure storage (e.g. DLT) of the quantum cloud platform 102. This may include the central server 104a of the quantum cloud platform 102 storing the encrypted data item by dividing it into data shards, for example six data shards, each with its own cryptographic key and storing the encrypted data shards on the distributors chosen storage (e.g. minimum of 3 copies of each data shard, each with its own unique infrastructure generated quantum key, that is each shard is on its own unique infrastructure with its own generated quantum key). The metadata to reassemble the shards of encrypted data is stored on the secure storage (e.g. quantum cloud platform DLT server(s)). In step 136, the central server 104a determines when the second endpoint 106b logs onto the quantum cloud platform. When the second endpoint 106b (e.g. Bob) logs on to quantum cloud platform 102, the central server may inform the second endpoint 106b of the details of the transfer of the encrypted data item from the first endpoint device 106a so that it can proceed to download the encrypted data item. In step 138, the central server 104a and the second endpoint device 106b establish a plurality of secure channels therebetween using the third cryptographic key. In step 140, the encrypted data item is retrieved from secure storage (e.g. DLT) and the encrypted data shards of the data item are securely transmitted via the secure data channels to the second endpoint device 106b. This may include the central server/endpoint 106b using a series of HTTP GET operations.

Figure 1D:
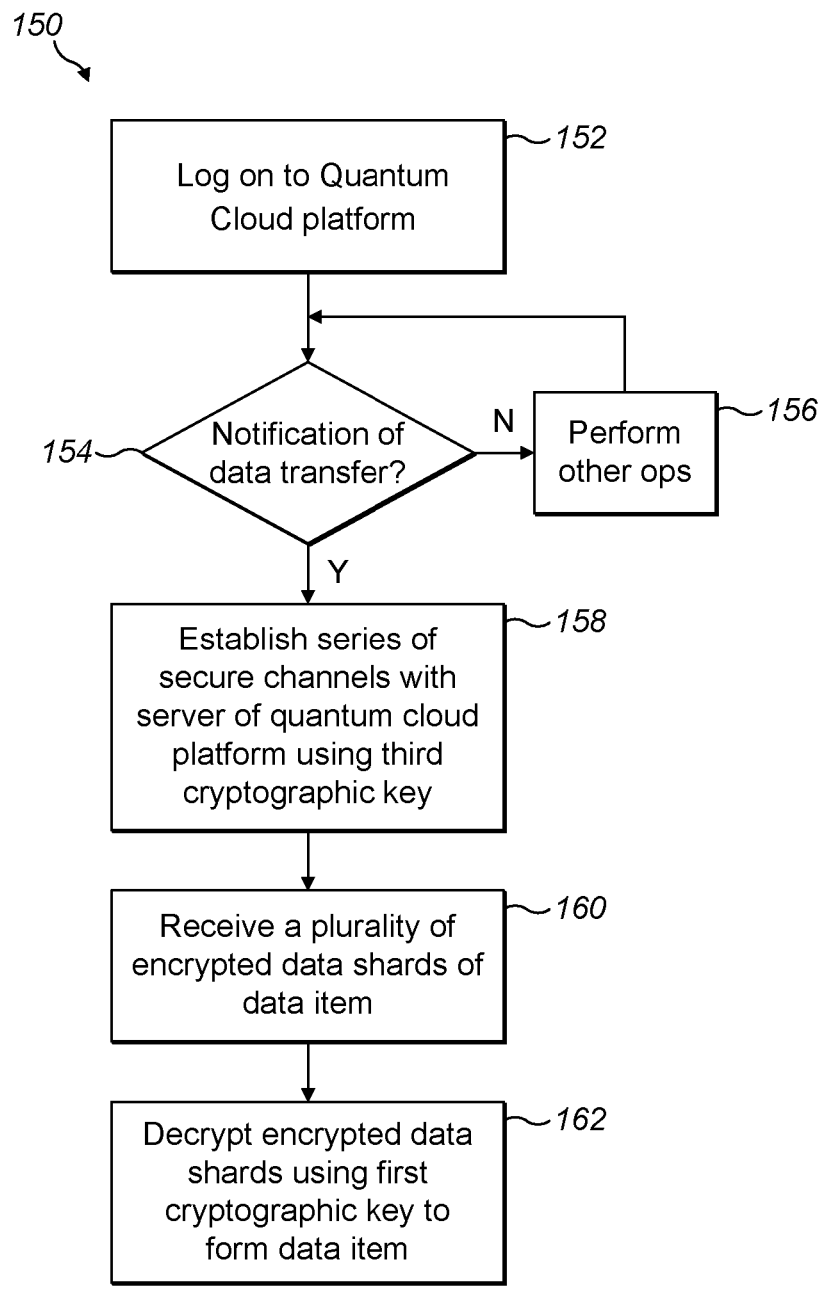
FIG. 1d is a flow diagram illustrating another example quantum streaming process according to some embodiments of the invention.

FIG. 1d is a flow diagram illustrating an example of a quantum streaming process 150 performed by the second endpoint device 106b for streaming a data item from the first endpoint 106a to the second endpoint 106b via the cloud server 104a of the quantum cloud system 100 of FIG. 1a according to some embodiments of the invention. The quantum streaming process 150 may include the following steps, performed at the second endpoint device 106b. In step 152, the endpoint device 106b may log on to the quantum cloud platform 102. As an option, the second endpoint device 106b may be notified by the quantum cloud platform 102 that a data transfer is waiting and so the second endpoint device 106b may log onto the quantum cloud platform. In step 154, the second endpoint device 106b may be notified of a transfer of a data item from first endpoint device 106a. If endpoint device 106b is notified of such a transfer (e.g. 'Y'), then the process 150 proceed to step 158. Otherwise, if it is not notified (e.g. 'N') the process proceeds to step 156, where the endpoint device 106b may perform other operations, transfers and the like whilst securely logged on to quantum cloud platform 102. In step 158, when the second endpoint device 106b is notified of a transfer of an encrypted data item from first endpoint device 106a, the second endpoint device 106b establishes a series/plurality of secure channels with the central server 104a of quantum cloud platform 102 using a third cryptographic key, which is known only to the endpoint device 106b and the central server 104a. In step 160, the endpoint 106b receives a plurality of encrypted data shards of the encrypted data item from the central server 104a over the plurality of secure channels between quantum cloud platform 102 and the endpoint device 106b. In step 162, the endpoint device 106b is configured to decrypt the encrypted data shards using the first cryptographic key known only to the first and second endpoint devices 106a and 106b. This enables endpoint device 106b to decrypt the encrypted data shards of the data item or file and reconstruct the data item or file.

Further modifications and/or advantages of the quantum streaming process 120, 130 and 150 may include, without limitation, for example the separate streams of encrypted data shards to be routed over multiple channels, enhancing reliability and throughput. Use of authenticated encryption for end-to-end encryption of the data item or file data shards enables secure communication via an untrusted intermediary device (e.g. central server). The streamed data item that is in motion may be sent over a plurality of uniquely encrypted quantum safe channels (e.g. 16 quantum safe channels). That is the endpoint devices 106a and 106b may perform quantum key distribution in order to exchange a quantum safe key as the first cryptographic key. Similarly, the first endpoint device 106a may perform a quantum key distribution in order to exchange a quantum safe key with the central server 104a and/or the quantum cloud platform 102, thus the second cryptographic key may be a second quantum safe key known only by the first device 106a and the central server 104a or the quantum cloud platform 102. As well, in a similar fashion, the second endpoint device 106b may perform a quantum key distribution in order to exchange another quantum safe key with the central server 104a and/or the quantum cloud platform 102, thus the third cryptographic key may be a third quantum safe key known only by the second device 106a and the central server 104a or the quantum cloud platform 102. Thus, the first, second and third quantum safe keys may be used in QS quantum streaming processes 120, 130 and 150 by replacing the first, second and third cryptographic keys and ensuring quantum-safe end-to-end security for transferring the data item from the first endpoint device 106a to the second endpoint device 106b. During the time the encrypted data item is stored in the quantum cloud platform, the data at rest may be stored in a plurality of pieces with multiple copies of each piece of data (e.g. six separate pieces with three copies of each piece of data) stored on separate resilient enterprise storage devices, which may form a DLT in the quantum cloud platform 102 and the like. As an option, transport layer security (TLS) 1.3 or future versions may be used between endpoint devices 106a and 106b and the central server 104a.

Figure 2:
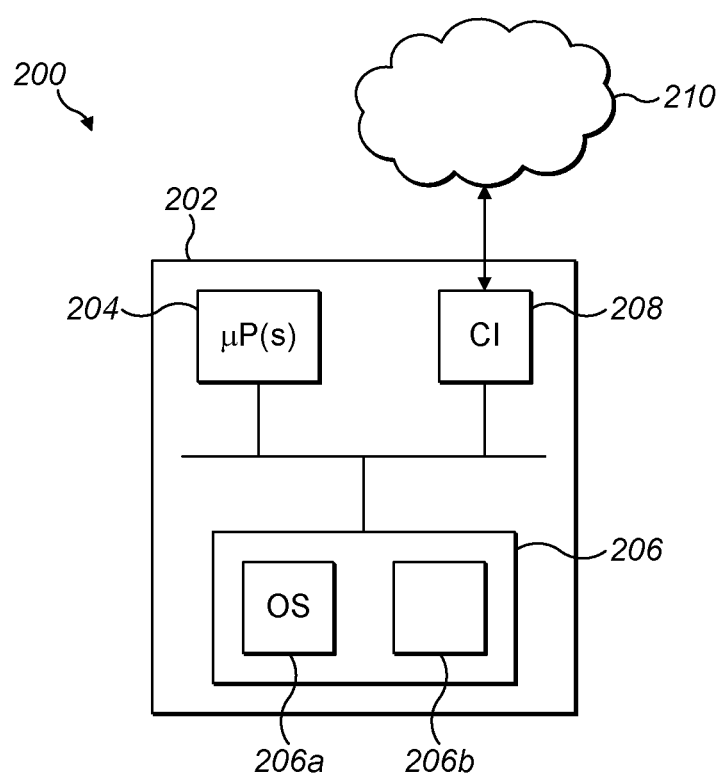
FIG. 2 is a schematic diagram of a computing system/device according to the invention.

FIG. 2 is a schematic diagram of an example computing system 200 for quantum safe streaming of data items according to aspects of the invention. Computing system 200 may be used to implement one or more aspects of the methods, systems, platforms, process(es), quantum safe quantum streaming process(es) as described with reference to FIGS. 1a-1d. Computing system 200 includes a computing device 202 that includes one or more processor units 204, memory unit 206 and communication interface 208 in which the one or more processor units 204 are connected to the memory unit 206 and the communication interface 208. The communication interface 208 may be configured for communicating over network 210 with one or more endpoint devices (not shown), one or more central servers (not shown), one or more QS servers (not shown) and/or one or more quantum cloud platforms (not shown) and the like. The memory unit 206 may store one or more program instructions, code or components such as, by way of example only but not limited to, an operating system 206a for operating computing device 202 and a data store 206b for storing program instructions, code and/or components associated with implementing the functionality and/or one or more functions or functionality associated with one or more endpoint devices and/or central servers for performing quantum safe quantum streaming of data items between endpoint devices via the one or more central servers and the like, one or more methods and/or processes of transferring, storing and/or streaming data items and/or files and the like, combinations thereof, modifications thereto, and/or as described herein with reference to at least any one of FIGS. 1a to 1d.

In the embodiment described above the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs), System-on-Chip (SOC) circuits, etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

Embodiments of the present invention are further set out in the following clauses:

1. A system as herein described with reference to the accompanying drawings.
2. A quantum cloud platform as herein described with reference to the accompanying drawings.
3. An apparatus as herein described with reference to the accompanying drawings.
4. A computer program product as herein described with reference to the accompanying drawings.
5. A computer program product as herein described with reference to the accompanying drawings.
6. A quantum safe streaming method as herein described with reference to the accompanying drawings.

The invention claimed is:

1. A computer-implemented method for quantum-safe quantum streaming of data items from a first endpoint device to a second endpoint device via a server of a quantum cloud platform, the method, performed at the first endpoint device, comprising:
   splitting a data item into a plurality of data shards that allow reconstruction of the data item;
   encrypting each of the data shards separately using a first cryptographic key,
   wherein the first cryptographic key is shared between the first endpoint device and the second endpoint device;

establishing a series or a first plurality of secure channels with a server of a quantum cloud platform using a second cryptographic key,
wherein the second cryptographic key is shared between the endpoint and the server; and
transmitting the plurality of encrypted shards towards the second endpoint device via the server over the series or plurality of secure channels.

2. The computer-implemented method according to claim 1, wherein the first cryptographic key is a first quantum-safe key, and/or the second cryptographic key is a second quantum-safe key.

3. The computer-implemented method according to claim 1, wherein the first and second cryptographic keys are different.

4. A computer-implemented method for quantum safe quantum streaming of data items from a first endpoint device to a second endpoint device via a server of a quantum cloud platform, the method, performed at the server, comprising:
receiving a plurality of encrypted data shards of a data item from the first endpoint device via a first series or plurality of secure channels,
wherein each data shard is encrypted using a first cryptographic key known only to the first endpoint device and the second endpoint device,
wherein the data item can be reconstructed from the plurality of data shards, and
wherein the first series or plurality of secure channels is established with the first endpoint device based on a second cryptographic key known only to the first endpoint device and the server;
securely storing the encrypted data shards of the data item in a secure storage of the quantum cloud platform;
in response to the second endpoint logging onto the quantum cloud platform, establishing a second series or plurality of secure channels with the second endpoint using a third cryptographic key,
wherein the third cryptographic key is shared between the second endpoint device and the server;
retrieving the encrypted data shards of the data item from secure storage; and
transmitting the encrypted data shards over the second series or plurality of secure channels to the second endpoint device.

5. A computer-implemented method for quantum safe quantum streaming of data items from a first endpoint device to a second endpoint device via a server of a quantum cloud platform, the method, performed at the second device comprising:
connecting to the quantum cloud platform;
in response to a data transfer of an encrypted data item from the first endpoint device, the encrypted data item being encrypted with a first cryptographic key known only to the first and second endpoints, establishing a series or plurality of secure channels with the server using a third cryptographic key, which is known only to the second endpoint device and the server;
receiving a plurality of encrypted data shards of the encrypted data item from the server over the plurality of secure channels,
wherein the data item can be reconstructed from the plurality of data shards; and
decrypting the encrypted data shards using the first cryptographic key to reconstruct the data item transferred from the first endpoint device.

6. The computer-implemented method according to claim 5, wherein the first cryptographic key is a first quantum-safe key, and/or the third cryptographic key is a third quantum-safe key.

7. The computer-implemented method according to claim 5, wherein the first and third cryptographic keys are different.

8. A computer-implemented method for quantum safe quantum streaming between a first endpoint device and second endpoint device via a server of a quantum cloud platform comprising:
splitting, at the first endpoint device, a data item into a plurality of data shards that allow reconstruction of the data item;
encrypting, at the first endpoint device, each of the data shards separately using a first cryptographic key shared between the first endpoint device and the second endpoint device;
establishing, between the first endpoint device and the server, a first series or plurality of secure channels with the server of the quantum cloud platform using a second cryptographic key, the second cryptographic key being shared between the endpoint and the server; and
transmitting, from the first endpoint device to the server, the plurality of encrypted shards towards the second endpoint device via the server over the plurality of secure channels;
receiving, at the server, the plurality of encrypted data shards of the data item transmitted from the first endpoint device over the first plurality of secure channels, each data shard encrypted using the first cryptographic key known only to the first endpoint device and the second endpoint device;
securely storing, by the server, the encrypted data shards of the data item in a secure storage of the quantum cloud platform;
in response to the second endpoint logging onto the quantum cloud platform, establishing a second series or plurality of secure channels with the second endpoint using a third cryptographic key, the third cryptographic key shared between the second endpoint device and the server;
retrieving the encrypted data shards of the data item from secure storage;
transmitting the encrypted data shards over the second plurality of secure channels to the second endpoint device;
receiving, at the second endpoint, a plurality of encrypted data shards of the encrypted data item from the server over the second series or plurality of secure channels; and
decrypting the encrypted data shards using the first cryptographic key to reconstruct the data item transferred from the first endpoint device.

9. The computer-implemented method according to claim 8, when the first cryptographic key is a first quantum safe key, the second cryptographic key is a second quantum safe key, and/or the third cryptographic key is a third quantum-safe key.

10. The computer-implemented method according to claim 8, wherein the first encryption key is different to the second and third encryption keys.

11. The computer-implemented method according to claim 8, wherein the second and third encryption keys are different.

12. The computer-implemented method according to claim 8, wherein the quantum cloud platform comprises:
a quantum-safe (QS) network, the QS network comprising:
one or more QS server(s) and
a repository for storing and accessing the data items.

13. The computer-implemented method according to claim 12, wherein each QS server comprises:
a hardware security module, HSM, for storing an identical set of quantum distributed, QD, keys or quantum-safe keys,
wherein the identical set of QD keys are distributed to each of said QS servers in a quantum-safe manner.

14. The computer-implemented method according to claim 13, wherein each of the QS servers is configured to communicate securely with each of the other QS servers and with the repository using one or more available QD keys from the identical set of QD keys.

15. The computer-implemented method according to claim 14, wherein one or more further available QD keys from the set of QD keys are distributed as quantum safe keys to each of the first and second endpoint devices.

16. The computer-implemented method according to claim 8, wherein the data item may be reconstructed from a partial subset of the plurality of data shards.

17. The computer-implemented method according to claim 8, wherein the data item may be reconstructed based on metadata comprising information for reassembling the data item from the plurality of data shards.

18. The computer-implemented method according to claim 17, further comprising:
storing, by the server, the metadata in the secure storage of the quantum cloud platform.

19. The computer-implemented method according to claim 8, further comprising:
storing, by the server, a plurality of copies of one or more of the encrypted data shards, wherein each copy is associated with a unique infrastructure generated quantum key.

20. The computer-implemented method according to claim 8, further comprising, prior to establishing the series or plurality of secure channel receiving, by the second endpoint device, a notification from the quantum cloud platform that a data transfer from the first endpoint device is waiting; and
in response to receiving the notification, establishing the second series or plurality of secure channels.

21. The computer-implemented method according to claim 20, wherein if the second endpoint device does not receive the notification, further comprising, performing, by the second endpoint device, one or more other operations or transfers.

* * * * *